(12) United States Patent
Eberst et al.

(10) Patent No.: US 9,033,409 B2
(45) Date of Patent: May 19, 2015

(54) WIND PROTECTION DEVICE ON AN OPENABLE ROOF PORTION OF A MOTOR VEHICLE

(71) Applicants: Hartmut Eberst, Schwaebisch Gmuend (DE); Michael Heidan, Stuttgart (DE)

(72) Inventors: Hartmut Eberst, Schwaebisch Gmuend (DE); Michael Heidan, Stuttgart (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 14/197,400

(22) Filed: Mar. 5, 2014

(65) Prior Publication Data

US 2014/0252809 A1    Sep. 11, 2014

(30) Foreign Application Priority Data

Mar. 8, 2013    (DE) .......................... 10 2013 203 979

(51) Int. Cl.
*B60J 7/22*          (2006.01)

(52) U.S. Cl.
CPC .......................................... *B60J 7/22* (2013.01)

(58) Field of Classification Search
CPC ............... B60J 7/22; B60J 7/223; B60J 7/226
USPC ........................................................ 296/217
See application file for complete search history.

(56) References Cited

U.S. PATENT DOCUMENTS

| | | | | |
|---|---|---|---|---|
| 5,465,557 A | * | 11/1995 | Harte | 53/510 |
| 6,059,356 A | * | 5/2000 | Hoelzel et al. | 296/218 |
| 6,834,914 B2 | | 12/2004 | Bohm et al. | |
| 7,152,917 B2 | * | 12/2006 | Manders | 296/217 |
| 7,441,834 B2 | * | 10/2008 | Eller et al. | 296/217 |
| 8,353,557 B2 | * | 1/2013 | Rooijakkers | 296/217 |
| 2003/0168892 A1 | | 9/2003 | Bohm et al. | |

FOREIGN PATENT DOCUMENTS

| | | |
|---|---|---|
| DE | 102 48 864 B3 | 2/2004 |
| DE | 103 48 381 A1 | 9/2004 |
| DE | 20 2006 002 018 U1 | 9/2006 |
| DE | 10 2005 033 431 A1 | 2/2007 |
| EP | 1 342 600 A2 | 9/2003 |

* cited by examiner

*Primary Examiner* — Dennis H Pedder
(74) *Attorney, Agent, or Firm* — Flynn, Thiel, Boutell & Tanis, P.C.

(57) ABSTRACT

Wind protection device on an openable roof portion of a motor vehicle having a curved wind deflection member on which a flexible wind protection structure is retained and which has at least one lateral wind deflection arm which can be displaced by means of a guiding mechanism in the vertical direction and in the longitudinal direction of the openable roof portion in such a manner that the curved wind deflection member can be displaced between a lower rest position and an upwardly deployed operating position in which the wind protection structure is set up. The guiding mechanism includes a resilient unit in order to support the movement of the curved wind deflection member into the operating position thereof. The guiding mechanism also has a linear force guide having a curved guiding path, along which the curved wind deflection member is displaced in the longitudinal and vertical direction relative to the roof portion.

13 Claims, 4 Drawing Sheets

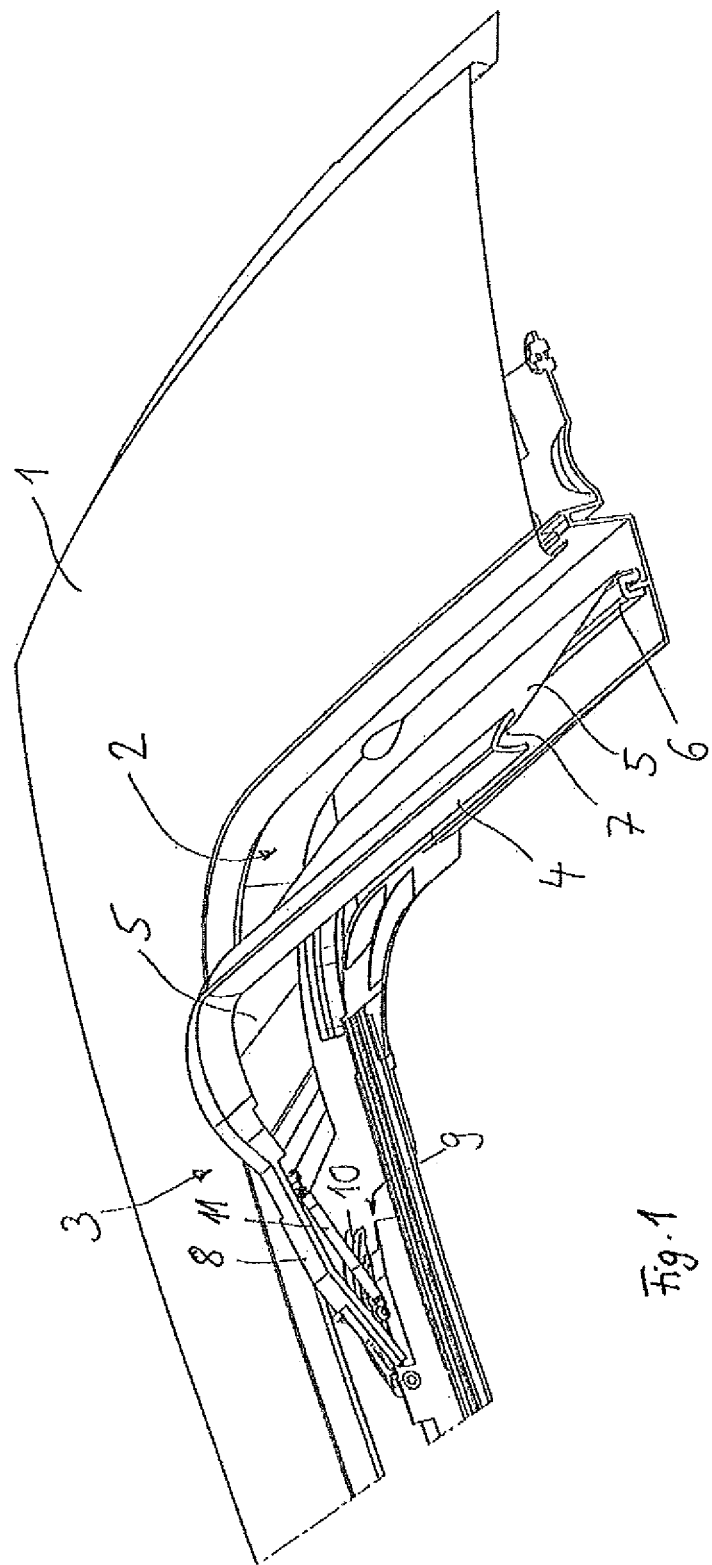

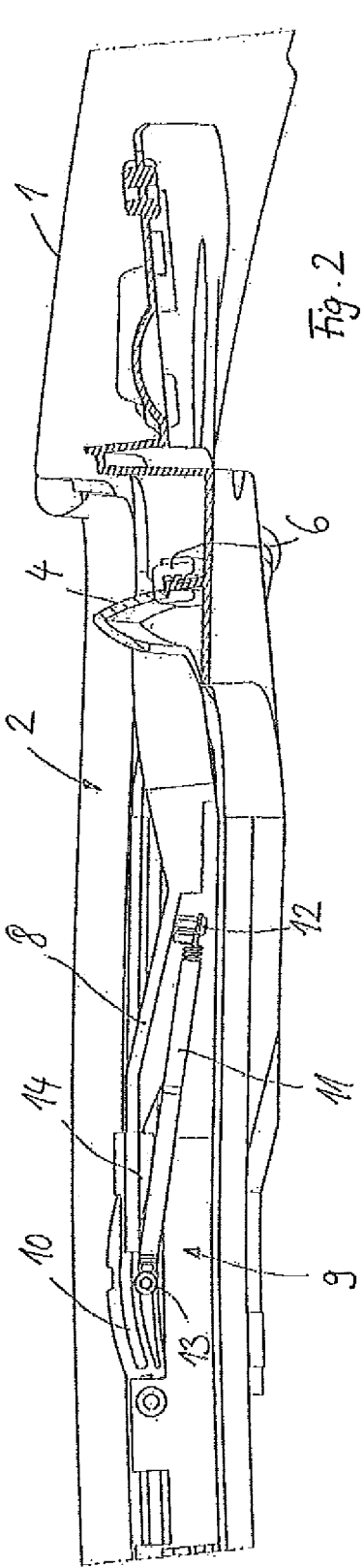
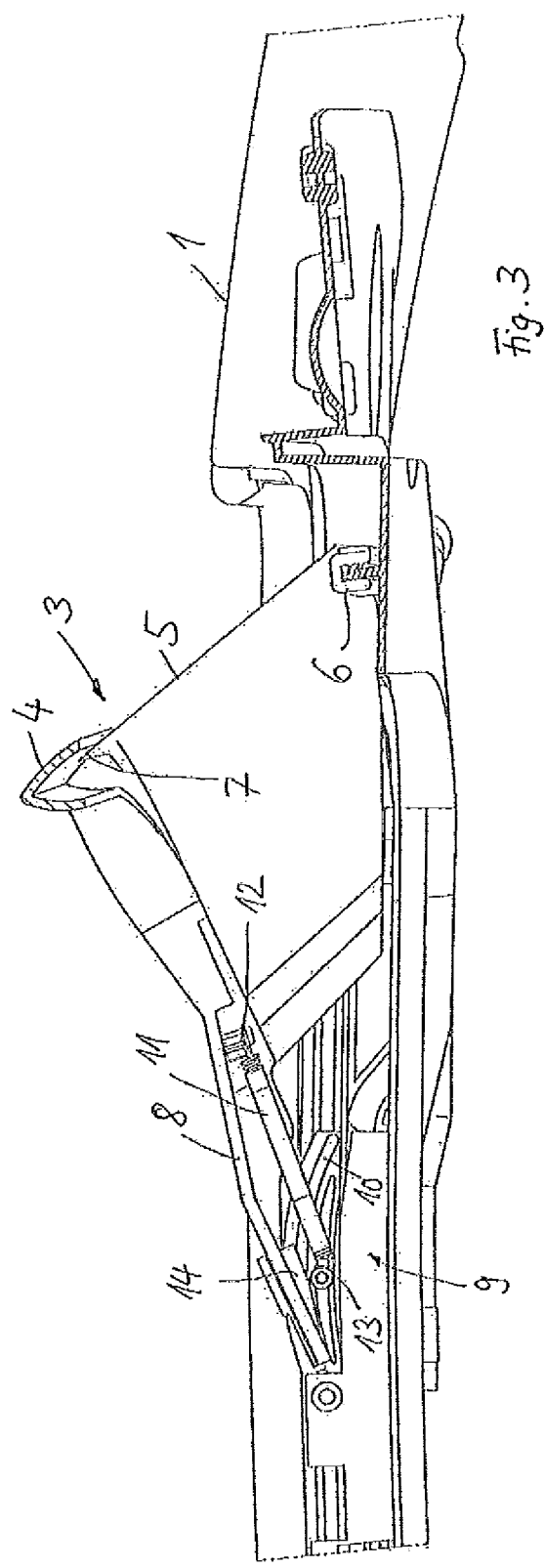

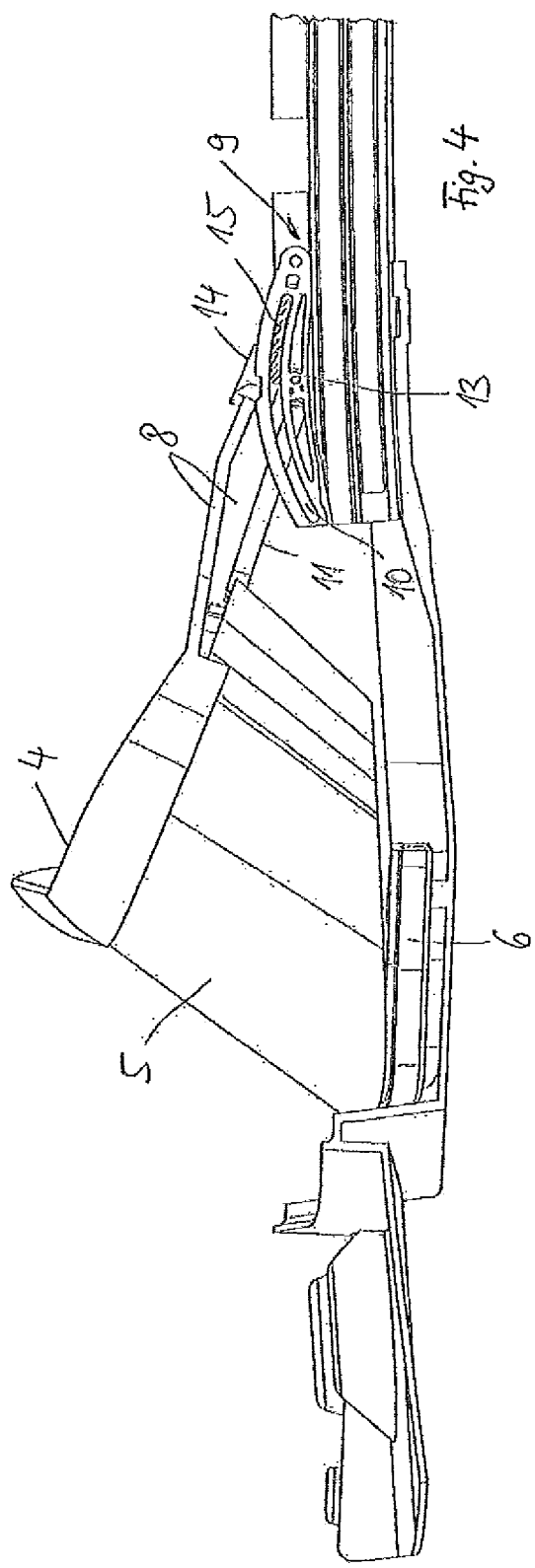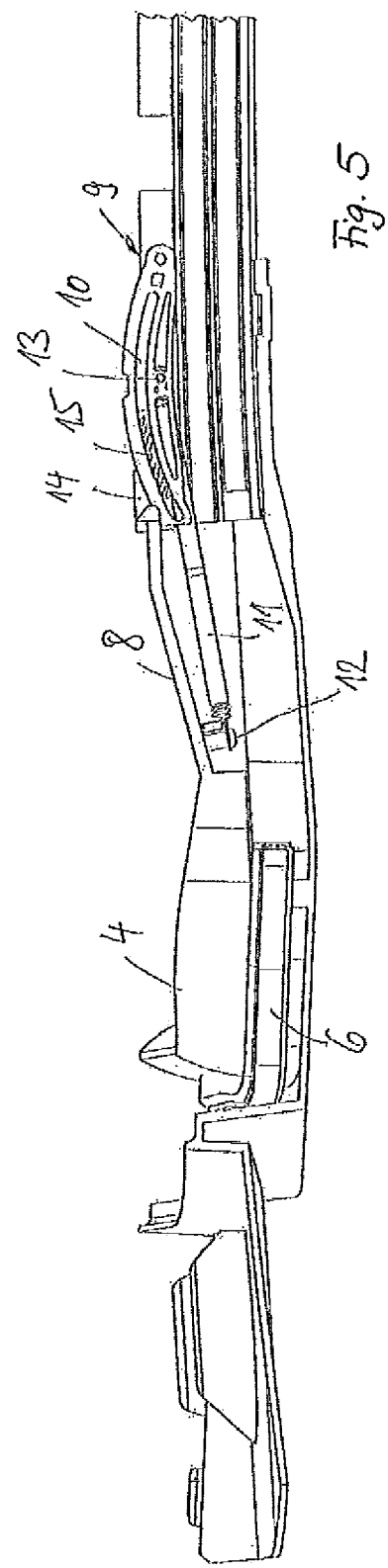

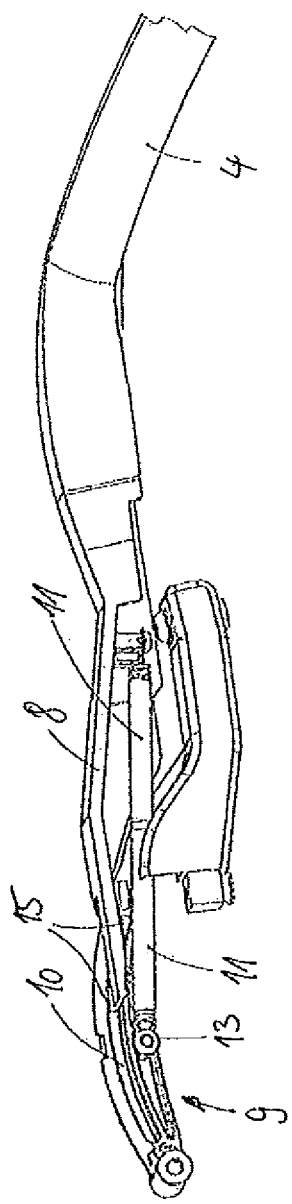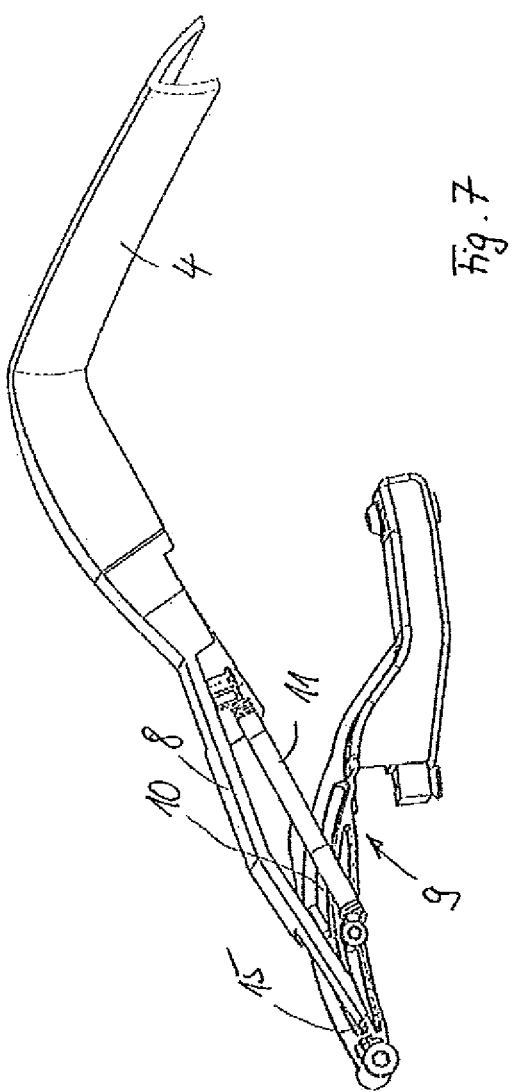

WIND PROTECTION DEVICE ON AN OPENABLE ROOF PORTION OF A MOTOR VEHICLE

CROSS-REFERENCE TO RELATED APPLICATION

This application claims the priority of the German patent application DE 10 2013 203 979.4, the disclosure of which is hereby incorporated into this application.

FIELD OF THE INVENTION

The invention relates to a wind protection device on an openable roof portion of a motor vehicle having a curved wind deflection member on which a flexible wind protection structure is retained and which has at least one lateral wind deflection arm which can be displaced by means of a guiding mechanism in the vertical direction and in the longitudinal direction of the openable roof portion in such a manner that the curved wind deflection member can be displaced between a lower rest position and an upwardly deployed operating position, in which the wind protection structure is set up, wherein the guiding mechanism comprises a resilient unit in order to support the movement of the curved wind deflection member into the operating position thereof.

BACKGROUND OF THE INVENTION

Such a wind protection device is known from DE 10 2005 033 431 B4. The known wind protection device is arranged in a front region of an openable roof portion of a passenger vehicle. The wind protection device has a curved wind deflection member which is provided at the opposing side regions thereof with a wind deflection arm, respectively. The curved wind deflection member serves to set up a flexible wind protection structure in an upward direction and thus to achieve the desired wind protection. In order not to impede an opening movement of a movable roof member of the roof portion, the curved wind deflection member, in addition to a pivoting movement upward in a vertical direction in order to set up the flexible wind protection structure, is supported so as to be able to be moved toward the rear in the longitudinal direction of the roof portion. To this end, the curved wind deflection member is supported in a pivotably movable manner by means of the wind deflection arms thereof on two pivot pins which define a pivot axis which extends in the transverse direction of the roof. The pivot pins of the wind deflection arms are further displaceably guided in linear slotted guides. In order to support a pivot movement of the curved wind deflection member in an upward direction and a displacement movement of the wind deflection arms and the curved wind deflection member in a backward direction in the slotted guides, there is associated with each wind deflection arm a leg spring, one member of which is supported on the wind deflection arm and acts as a lever arm for raising and pushing the wind deflection arm backward. The transfer of the curved wind deflection member from the raised operating position in which the flexible wind protection structure is set up into the rest position is carried out automatically via a closure movement of the roof member of the roof portion, whereby the curved wind deflection member is pushed forward counter to the resilient force of the leg springs and is pressed downward.

EP 1 342 600 A2 provides for another wind protection device for a sliding roof system of a vehicle roof in which a flexible wind protection structure in the form of a net is set up by means of a curved wind deflection member. The curved wind deflection member is supported without any possibility of longitudinal displacement only in a pivotably movable manner on the sliding roof system. In the region of the pivot axis of the curved wind deflection member, coaxially arranged leg springs are provided at the front-end sides of the lateral wind deflection arms. One member of each leg spring is injected into the associated wind deflection arm at the end side, respectively.

SUMMARY OF THE INVENTION

An object of the invention is to provide a wind protection device of the type mentioned in the introduction which is space-saving and which is constructed in a simple manner.

This object is achieved in that the guiding mechanism for the wind deflection arm has a linear force guide having a curved guiding path along which the curved wind deflection member can be displaced in the longitudinal and vertical direction relative to the roof portion. In place of a combined linear guide and pivoting support, as is the case in the prior art, the solution according to the invention combines the two movement functions in a vertical direction and longitudinal direction of the openable roof portion by means of the linear force guide having a curved guiding path. The curvature of the guiding path is arranged in such a manner that in an end position the wind deflection arm is deployed upward and in the other end position the wind deflection arm is arranged in a recessed manner below a movable roof member. In an advantageous manner, the curved wind deflection member is provided at opposing sides of the curved wind deflection member with two wind deflection arms which are each provided with guiding mechanisms which are constructed so as to be identical to each other. A synchronous movement of both wind deflection arms and consequently a uniform movement of the curved wind deflection member between the rest position and the upwardly deployed operating position thereof can thereby be achieved. As a result of the linear force-guiding action along the curved guiding path, the guiding mechanism requires no additional movable components such as a lever arm or the like. The solution according to the invention therefore offers a particularly simple and operationally reliable construction.

In an embodiment of the invention, the curved wind deflection member has two opposing wind deflection arms with which mutually functionally identical force guides are associated, respectively. Each wind deflection arm therefore in each case has a guiding mechanism which is provided with a linear force guide having a curved guiding path. The guiding mechanisms of both sides can either be constructed so as to be completely identical to each other, or be constructed so as to be mirror-symmetrical with respect to a vertical longitudinal centre plane of the roof portion, but otherwise constructed in an identical manner.

In another embodiment of the invention, the linear force guide is formed by an arcuately curved slotted guide and at least two guiding locations which can be displaced in the slotted guide, wherein the slotted guide or the guiding locations are rigidly connected to the wind deflection arm and in a corresponding manner the guiding locations or the slotted guide are arranged in a stationary manner with respect to the roof portion. Advantageously, the at least two guiding locations are rigidly connected to the respective wind deflection arm and the slotted guide is arranged on the roof portion in a stationary manner. The guiding locations are intended to be understood to be the abutment locations of corresponding guiding portions of the wind deflection arms in the respective slotted guide. The at least two guiding locations are spaced apart from each other in the longitudinal direction of the slotted guide in order to achieve the forced guiding of the respective wind deflection arm relative to the curved guiding path in the slotted guide and to prevent an undesirable additional degree of freedom, such as in particular a degree of pivoting freedom, from being present. The at least two guiding locations which are spaced apart from each other in the longitudinal direction of the slotted guide may be provided on a single guiding portion, such as a guiding web or a sliding block. Alternatively, it is possible to associate the at least two guiding locations with a plurality of guiding portions, such as in particular at least two guiding pins which are spaced apart from each other and which are guided in the slotted guide.

In another embodiment of the invention, the guiding locations are supplemented to form a guiding web which is curved so as to complement the slotted guide and which is arranged on the wind deflection arm in a rigid manner, and the slotted guide is arranged in a stationary manner on the roof portion. Advantageously, the wind deflection arm protrudes upward at an acute angle relative to the guiding web, wherein the guiding web in particular is integrally formed on the wind deflection arm. As a result of the oblique orientation of the wind deflection arm relative to the guiding web and the integral formation of the guiding web on the wind deflection arm, a displacement of the wind deflection arm with the curved guiding web relative to the curved slotted guide necessarily leads to the wind deflection arm protruding upward in an oblique manner in an end position thereof and, in the other end position, extending either in an oblique manner downward or approximately parallel with an opening plane of the roof portion.

In another embodiment of the invention, the resilient unit is articulated to the wind deflection arm in such a manner that a pushing or pulling force along the slotted guide is applied to the wind deflection arm in the direction of the raised operating position. When the roof portion is opened, the respective wind deflection arm is thereby necessarily moved into the raised operating position in which the flexible wind protection structure is set up in order to achieve the desired wind protection.

In another embodiment of the invention, the resilient unit is constructed as a helical spring which is articulated to the wind deflection arm on the one hand and to the stationary roof portion on the other hand. The helical spring is preferably constructed in a cylindrical manner and can be accommodated in a space-saving manner.

In another embodiment of the invention, the helical spring is arranged below the wind deflection arm and extends at least approximately parallel with the wind deflection arm. If the wind deflection arm is constructed as a U-shaped, C-shaped or L-shaped hollow profile-member, the helical spring may be integrated in a particularly advantageous manner at least partially spatially in this correspondingly open hollow profile-member by the helical spring being at least partially embedded in the hollow profile-member or being closely fitted thereto.

In another embodiment of the invention, the helical spring is constructed as a tension spring or pressure spring. Depending on the configuration, the helical spring applies pushing or pulling forces to the respective wind deflection arm.

In another embodiment of the invention, the flexible wind protection structure is connected to the curved wind deflection member by means of thermally activated material engagement, in particular by means of welding or thermoriveting. Ultrasound welding may in particular be provided as the welding operation. During the thermoriveting operation, there are provided on the curved wind deflection member thermoplastically deformable domes which melt with the wind protection structure during thermal activation. Alternatively, the wind protection structure may be connected to the curved wind deflection member by mechanical securing means, in particular by means of clips, screws or rivets. It is also possible also to inject the wind protection structure during the production of the curved wind deflection member from a thermoplastic plastics material. Direct injection of the wind protection structure is advantageous not only in the region of the upper curved wind deflection member, but also in the region of the lower fixing of the wind protection structure with respect to a retention strip.

BRIEF DESCRIPTION OF THE DRAWINGS

Other advantages and features of the invention will be appreciated from the claims and from the following description of a preferred exemplary embodiment of the invention which is illustrated with reference to the drawings, in which:

FIG. 1 is a schematic, perspective view of an embodiment of a wind protection device according to the invention on an openable roof portion, FIG. 2 is an enlarged schematic sectioned view of the wind protection device according to FIG. 1 in which a curved wind deflection member is located in a lower rest position, FIG. 3 shows the wind protection device according to FIG. 2, the curved wind deflection member being located in its upwardly raised operating position, FIG. 4 is a schematic sectioned view of the wind protection device according to claim 3, when viewed from an outer side, FIG. 5 is a schematic sectioned view of the wind protection device according to FIG. 2, when viewed from an outer side, FIG. 6 is an isometric view of a cut-out of the wind protection device according to FIGS. 1 to 5 in the rest position of the curved wind deflection member, and FIG. 7 shows the illustration according to FIG. 6, with a curved wind deflection member moved into the operating position thereof.

DETAILED DESCRIPTION

A vehicle roof 1 of a passenger vehicle according to FIG. 1 has a roof portion 2 which comprises a movable roof system. The roof system has at least one movable sliding roof member which, depending on the position, opens or closes the roof opening of the roof portion 2. The sliding roof member is additionally constructed in such a manner that it can be deployed in an oblique manner.

A front edge region of the roof portion 2 when viewed in the normal travel direction of the passenger vehicle is provided with a wind protection device 3 which is described below in greater detail with reference to FIGS. 1 to 7. The wind protection device 3 has a curved wind deflection member 4 which extends over a width of the roof portion 2 transversely relative to the longitudinal direction of the roof portion 2 and consequently in the transverse direction of the vehicle and which merges at the opposing sides thereof in an integral manner into a wind deflection arm 8, respectively. The two wind deflection arms 8 at opposing sides of the curved wind deflection member 4 are provided at the opposing lateral edge regions of the roof portion 2 and extend in the longitudinal direction of the roof portion 2.

The curved wind deflection member 4 serves to move a flexible wind protection structure 5 in the form of a net, a woven textile fabric or knitted product or in the form of a plastics film into an obliquely upwardly raised operating position according to FIGS. 1, 3 and 4 and thereby to achieve wind protection for vehicle occupants when the roof portion 2 is open. The flexible wind protection structure 5 is welded at the lower edge region thereof to a retention strip 6 or connected in some other manner continuously to the retention strip 6. The retention strip 6 is secured to a stationary retention web of the roof portion 2 by means of attachment. An upper edge region of the flexible wind protection structure 5 which extends over the entire width of the curved wind protection member 4 is securely connected to a transverse profile-member of the curved wind protection member 4 over the entire width of the curved wind protection member 4 via a contact face 7. The connection of the upper edge region of the wind protection structure 5 to the transverse profile-member of the curved wind deflection member 4 in the region of the contact face 7 is carried out either by means of ultrasound welding or by means of thermally activated fixing of the edge region to the transverse profile-member of the curved wind deflection member 4. The thermal fixing is preferably produced by means of thermoriveting, during which, when viewed over the entire width of the transverse profile-member of the curved wind deflection member 4, a large number of thermoplastically deformable domes are arranged at the inner side on the transverse profile-member. The upper edge region of the wind protection structure 5 has corresponding holes by means of which the edge region of the wind protection structure 5 can be placed on the securing domes at the inner side of the transverse profile-member of the curved wind deflection member 4. Subsequently, the securing domes are plastically deformed by the application of pressure and heat, whereby a materially engaging and positive-locking connection is produced between the upper edge region of the wind protection structure 5 and the integrally formed-on securing domes of the curved wind deflection member 4.

The curved wind deflection member 4 is supported so as to be able to be moved between a rest position (see FIGS. 2, 5 and 6) in which the curved wind deflection member 4 is arranged below a movable roof portion which is located in the closure position thereof, and an upwardly raised operating position (see FIGS. 1, 3, 4 and 7). To this end, mutually identically constructed guiding mechanisms 9 are associated with the opposing wind deflection arms 8, each wind deflection arm 8 being supported by means of a guiding mechanism 9 so as to be able to be moved in the longitudinal direction and in the vertical direction of the roof portion. The two guiding mechanisms 9 for the opposing wind deflection arms 8 are constructed so as to be identical to each other with the exception of a structure which is mirror-symmetrical with respect to a vertical longitudinal centre plane of the roof portion so that both wind deflection arms 8 can be moved in the same direction and in a synchronous manner. The guiding mechanism 9 of the left-hand wind deflection arm 8 when viewed in the normal travel direction of the passenger vehicle is described below, as illustrated with reference to FIGS. 1 to 7. This description applies accordingly to the correspondingly opposing wind deflection arm and the associated guiding mechanism.

The curved wind deflection member 4 carries out between the lower rest position thereof and the upwardly raised operating position a combined movement in the longitudinal direction of the roof portion and in the vertical direction of the roof portion. This combined movement in the longitudinal and vertical direction is achieved by means of a guiding slide 14 which is integrally arranged on the wind deflection arm 8 and which is produced from plastics material in an integral manner with the wind deflection arm 8.

In an embodiment which is not illustrated, the guiding slide is produced as a separate component and subsequently connected to the wind deflection arm.

The guiding slide 14 has, in the region of the outer side thereof facing the lateral edge region of the roof portion 2, a guiding web 15 which is curved in the manner of a circular arc (see FIGS. 4 and 5) which is guided so as to be able to be linearly moved in a slotted guide 10 which is curved in the manner of a circular arc in a complementary manner. The slotted guide 10 is a stationary portion of the guiding mechanical system, which portion is securely connected to the lateral edge region of the roof portion 2 and is consequently retained in a manner secured to a vehicle. The slotted guide 10 extends in a vertical longitudinal plane of the roof portion and consequently at least largely parallel with the associated wind deflection arm 8. The wind deflection arm 8 merges integrally into the transverse profile-member of the curved wind deflection member 4. Since the guiding slide 14 is also arranged integrally on the wind deflection arm 8, a displacement of the guiding web 15 which is curved in the manner of a circular arc in the guiding path of the slotted guide 10, which path is also curved in the manner of a circular arc, also necessarily brings about, in addition to a longitudinal displacement of the curved wind deflection member 4, a movement of the curved wind deflection member 4 in the vertical direction (see in particular FIGS. 4 and 5).

Each guiding web 15 is formed integrally on the respective guiding slide 14. The curvature and thickness of the guiding web 15 are adapted to the curvature and height of the guiding path of the slotted guide 10 in such a manner that the guiding web 15 is forcibly guided inside the slotted guide 10 in a linear manner along a circular arc.

In order to enable an automatic raising movement of the curved wind deflection member 4 when the movable roof member of the roof portion 2 is opened, a resilient unit in the form of a helical tension spring 11 which is provided with a protective sheath engages in each case on the curved wind deflection member 4 in the region of each wind deflection arm 8. The helical tension spring 11 is articulated in the region of an articulation location 13 at one side below the stationary slotted guide 10 so as to be secured to the vehicle. At the other side, the helical tension spring 11 is articulated in the region of an articulation location 12 to the wind deflection arm 18 in the transition region between the wind deflection arm 8 and transverse profile-member of the curved wind deflection member 4. The helical tension spring 11 at each side of the curved wind deflection member 4 therefore applies to the curved wind deflection member 4 a pulling force in the longitudinal direction of the roof portion 2 in a backward direction as soon as the movable roof member is moved from the state thereof in which it closes the roof opening of the roof portion 2 in the direction of the open position thereof. As a result of the tensile force applied to the curved wind deflection member 4 in a backward direction, the guiding web 15 is pushed backward inside the slotted guide 10 from a front position according to FIG. 5. As a result of the displacement along the circular-arc-like guiding path of the slotted guide 10, the curved wind deflection member 4 is necessarily gradually raised until a rear stop for the guiding slide 14 is reached. In this end position, the curved wind deflection member 4 has reached its raised operating position according to FIGS. 1, 3 and 4. The tensile resilient force of the helical springs 11 retains the curved wind deflection member 4 in this raised operating position until the movable roof member is displaced from the open position in the direction of the closure position thereof again. The roof member which moves into the closure position thereof necessarily moves the curved wind deflection member 4 and presses it downward. At the same time, a movement component in the longitudinal forward direction is applied to the curved wind deflection member 4 by the roof member which is moving forward. The curved wind deflection member 4 is thereby again necessarily moved into the front and lower rest position thereof, as illustrated with reference to FIGS. 2 and 5.

The invention claimed is:

1. A wind protection device on a roof portion of a motor vehicle having a curved wind deflection member on which a flexible wind protection structure is retained and which has at least one lateral wind deflection arm which can be displaced by a guiding mechanism in a vertical direction and in a longitudinal direction of the roof portion in such a manner that the curved wind deflection member can be displaced between a lower rest position and an upwardly deployed operating position in which the wind protection structure is set up, wherein the guiding mechanism comprises a resilient unit in order to support movement of the curved wind deflection member into the operating position thereof, wherein the guiding mechanism for the wind deflection arm has a linear force guide having a curved guiding path along which the curved wind deflection member can be displaced in the longitudinal and vertical direction relative to the roof portion, and wherein the linear force guide is formed by an arcuately curved slotted guide and at least one guiding member, the at least one guiding member can be arcuately slid within and relative to, but not rotated relative to, the slotted guide, wherein the at least one guiding member is rigidly connected to the wind deflection arm and in a corresponding manner the slotted guide is arranged in a stationary manner with respect to the roof portion, wherein the slotted guide has a substantially horizontal orientation.

2. The wind protection device as claimed in claim 1, wherein the curved wind deflection member has two opposing lateral wind deflection arms with which mutually functionally identical force guides are associated, respectively.

3. The wind protection device as claimed in claim 1, wherein the wind deflection arm protrudes upward at an acute angle relative to the at least one guiding member.

4. The wind protection device as claimed in claim 1, wherein the resilient unit is articulated to the wind deflection arm in such a manner that a pushing force along the slotted guide is applied to the wind deflection arm in a direction of the operating position.

5. The wind protection device as claimed in claim 4, wherein the resilient unit is constructed as a helical spring which is articulated to the wind deflection arm and to the roof portion.

6. The wind protection device as claimed in claim 5, wherein the helical spring is arranged below the wind deflection arm and extends at least approximately parallel with the wind deflection arm.

7. The wind protection device as claimed in claim 5, wherein the helical spring is constructed as a pressure spring.

8. The wind protection device as claimed in claim 1, wherein the flexible wind protection structure is connected to the curved wind deflection member by a thermally activated material engagement.

9. A wind protection device for a roof portion of a motor vehicle, the wind protection device comprising:
a curved wind deflection member retaining a flexible wind protection structure, the curved wind deflection member having at least one lateral wind deflection arm;
a guiding mechanism for displacing the at least one lateral wind deflection arm in both a vertical direction and a longitudinal direction of the roof portion for displacing the curved wind deflection member between a lower rest position and an upwardly deployed operating position in which the wind protection structure is deployed;
the guiding mechanism comprising a resilient unit in order to support movement of the curved wind deflection member into the operating position thereof;
the guiding mechanism for the at least one lateral wind deflection arm including an arcuately curved slotted guide allowing the curved wind deflection member to be displaced in the longitudinal direction and the vertical direction relative to the roof portion;
the guiding mechanism for the at least one lateral wind deflection arm further including a guiding device slidably but not rotatably displaceable within the slotted guide, wherein the guiding device is rigidly connected to the at least one lateral wind deflection arm and in a corresponding manner the slotted guide is arranged in a stationary manner with respect to the roof portion, wherein the slotted guide has a substantially horizontal orientation.

10. The wind protection device as claimed in claim 9, wherein the curved wind deflection member has two opposing wind deflection arms with which mutually functionally identical force guides are associated.

11. The wind protection device as claimed in claim 9, wherein the slotted guide forms a rigid curved guiding web.

12. The wind protection device as claimed in claim 9, further including a helical spring connected to the curved wind deflection member.

13. The wind protection device as claimed in claim 12, wherein the helical spring is arranged below the wind deflection arm and extends at least approximately parallel with the wind deflection arm.

\* \* \* \* \*